United States Patent Office 2,759,993

Patented Aug. 21, 1956

2,759,993

COMPATIBLE IMAGE-REPRODUCING SYSTEM

Bernard D. Loughlin, Lynbrook, N. Y., assignor to Hazeltine Research, Inc., Chicago, Ill., a corporation of Illinois Application January 17, 1955, Serial No. 482,355

17 Claims. (Cl. 178—5.4)

GENERAL

Figure 1:
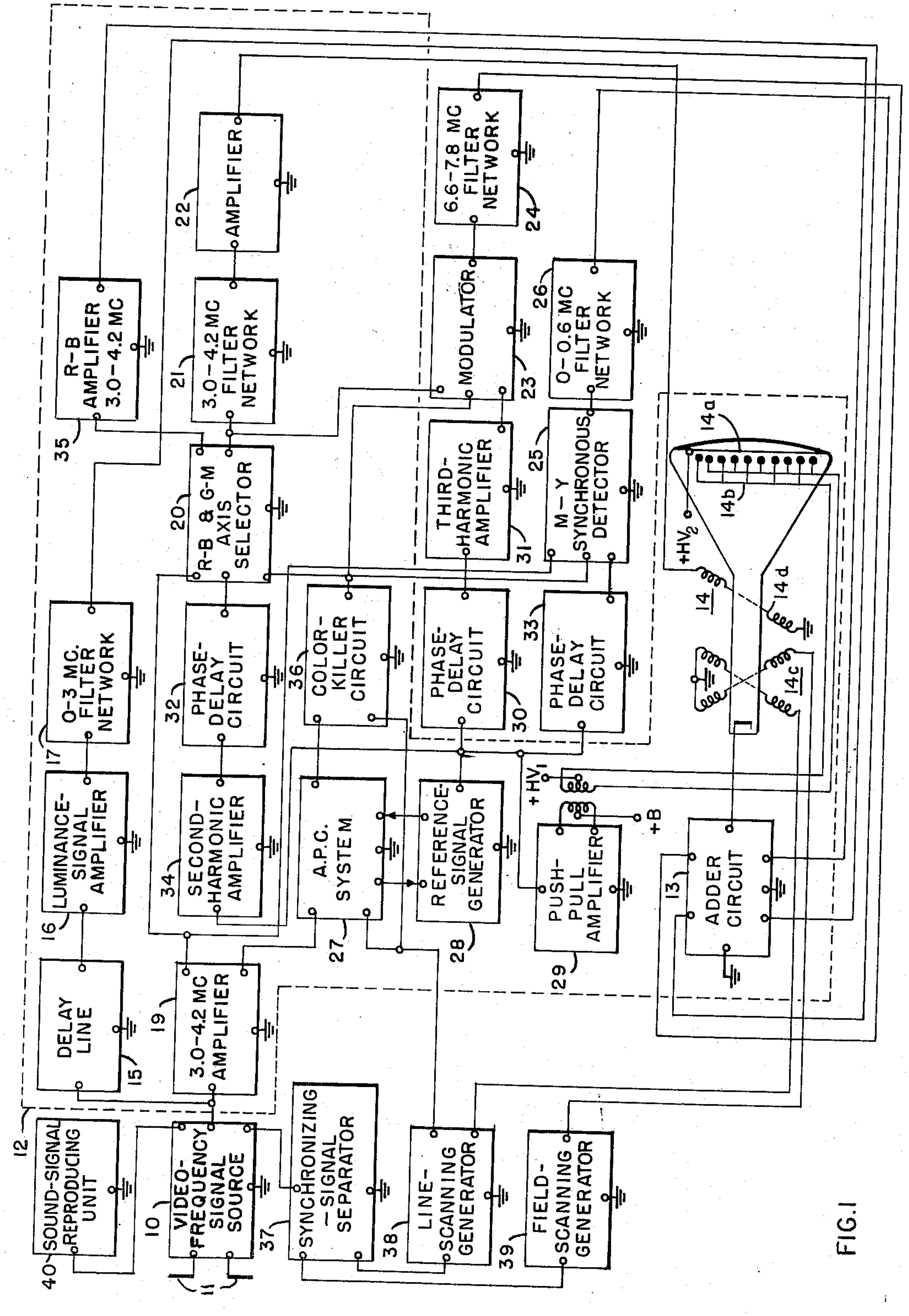

The present invention is directed to compatible image-reproducing systems particularly for color-television receivers and, more specifically, to such image-reproducing systems in a compatible color-television receiver of the NTSC type utilizing a single-gun type of picture tube employing a switching signal for directing the electron beam onto different color phosphors.

In a form of color-television system more completely discussed in many articles in the January 1954 issue of the Proceedings of the I. R. E. information representative of a scene in color being televised is utilized to develop at the transmitter two substantially simultaneous signals, one of which is primarily representative of the brightness or luminance and the other of which is representative of the chrominance of the televised image. The latter signal is a subcarrier wave signal having a mean frequency within the video-frequency pass band and having each of successive cycles thereof modulated in amplitude at different phases by signal components representative of specific hues of the televised image. The composite video-frequency signal comprising the luminance signal and the modulated subcarrier wave or chrominance signal is then employed in a conventional manner to modulate a radio-frequency wave signal. The signals just described are utilized in an NTSC type of system and, therefore, will be referred to hereinafter as NTSC type of signals.

A receiver in an NTSC type of system intercepts the radiated signal and derives the composite video-frequency signal, including the luminance and chrominance signals, therefrom. One type of such receiver includes a pair of principal channels for individually translating the luminance and chrominance information for application to an image-reproducing device in such receiver. The channel for translating the luminance signal is substantially the same as the video-frequency amplifier stages of a conventional monochrome receiver. In one type of receiver the channel for translating the chrominance signal includes means for deriving signals representative of the primary colors red, green, and blue and for combining such derived signals with the luminance signal to provide signals which may be utilized in an image-reproducing device to effect color reproduction of the televised image.

More recently, a one-gun type of image-reproducing device, referred to as a focus-mask type of device, and circuits for modifying the NTSC type of composite video-frequency signal for use in such device have been described in an article entitled "Processing of the NTSC color signal for one-gun sequential color displays" in the January 1954 issue of the Proceedings of the I. R. E. at pages 299–308, inclusive. As described in such article, the focus-mask type of picture tube includes repeating groups of parallel strips of different phosphors individually for emitting green, red, and blue colors, each group having the sequence green, red, green, blue. A grid structure comprising a plurality of conductors which are parallel to each other and to the phosphor strips on the screen has one of such conductors positioned behind each of the phosphor strips for emitting red and blue colors and none behind the strip for emitting green. Such grid is energized by a signal synchronized with the modulated subcarrier wave signal so as to direct the cathode-ray beam, intensity-modulated by the brightness and subcarrier wave signals, onto the proper phosphor strips as such beam translates information of the color emitted by the excited strip. As described in the I. R. E. article, an NTSC type of signal may not be applied directly to a picture tube of the type just described if fidelity of color reproduction is to be obtained. Prior to application to such picture tube, the luminance signal should be modified to include a luminance-correction component and the modulated subcarrier wave signal should be converted into one wave signal of the same mean frequency as the detected chrominance signal, and including only color information representative of red and blue, and into a second harmonic wave signal including information representative of green. The modified luminance signal and fundamental and second harmonic subcarrier wave signals are combined for application to such picture tube to effect reproduction of the color image.

Such modified NTSC type of composite video-frequency signal is adequate to reproduce a color image in such picture tube when color information is being transmitted and received. However, when only monochrome information is being received, or it is desired to reproduce a monochrome image from color signals, the black-and-white image reproduced in this type of picture tube tends to have spurious color patterns having red and blue elements. These spurious patterns apparently arise from a heterodyning of the high-frequency monochrome signals, particularly those signals in the range of 3–4 megacycles, with the color-switching operation occurring at approximately 3.6 megacycles. Such heterodyning results in low-frequency beat signals of approximately 0–.6 megacycle which appear with high visibility as red and blue patterns. These spurious effects have been reduced by including in the luminance channel a filter network having an upper cutoff frequency of approximately 3 megacycles so that effectively no luminance information above 3 megacycles is utilized. However, the use of such filter network is detrimental in preventing the reproduction of high-definition monochrome images. Though it is desirable to eliminate or minimize such spurious color patterns reproduced in a monochrome image, it is equally important to utilize all of the luminance information available in order to obtain the highest quality of reproduction and the maximum degree of compatibility. The compatible image-reproducing system in accordance with the present invention is designed to effect such result.

It is, therefore, an object of the present invention to provide a new and improved compatible image-reproducing system in which the deficiencies of prior such systems when utilizing an NTSC signal are diminished.

It is another object of the present invention to provide a new and improved image-reproducing system for a color-television receiver including a single-gun type of picture tube in which the monochrome images reproduced by such system have increased definition.

It is a still further object of the present invention to provide a new and improved compatible image-reproducing system for a color-television receiver including a single-gun type of picture tube, and in which an NTSC type of signal is employed, in which reproduced monochrome images have higher definition than in prior such systems with a minimum of spurious color patterns.

In accordance with the present invention, a compatible image-reproducing system comprises a circuit for supplying monochrome or color signals representative, respectively, of televised monochrome or color images and comprises image-reproducing apparatus. The image-reproducing apparatus includes a plurality of parallel color-reproducing strips, means for developing an electron beam, deflection means for causing the beam to scan a raster on the strips, and color-switching means for cyclically moving the beam across the strips to reproduce a monochrome or color image. Spurious color patterns tend to appear in the reproduced monochrome images from signals applied to the apparatus having frequencies in the vicinity of the color-switching frequency. The image-reproducing system also comprises a signal-translating channel coupled between the supply circuit and the beam-developing means for translating a band of the supplied monochrome signals having frequencies below the color-switching frequency for intensity-modulating the beam when monochrome images are being reproduced. Finally, the image-reproducing system comprises another signal-translating channel, including an auxiliary deflection means for developing a field in the path of the electron beam, and coupled to the supply circuit for translating a band of the supplied monochrome signals having frequencies in the vicinity of the color-switching frequency for effecting deflection modulation of the beam lengthwise of the strips to provide the high-definition monochrome information when monochrome images are being reproduced, thereby to minimize the spurious patterns in the reproduced monochrome images.

For a better understanding of the present invention, together with other and further objects thereof, reference is had to the following description taken in connection with the accompanying drawings, and its scope will be pointed out in the appended claims.

Figure 1A:
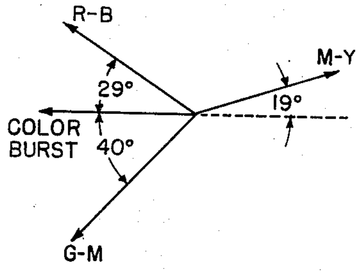
Figure 1B:
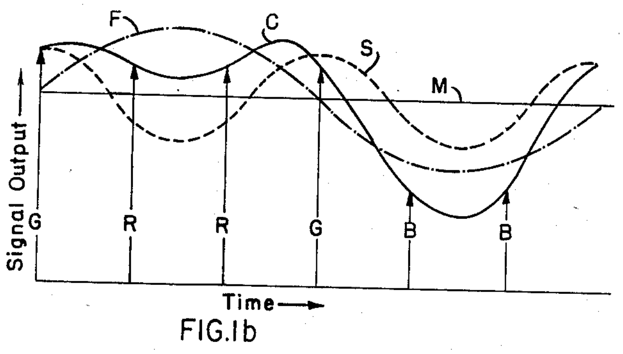
Figures 2, 3:
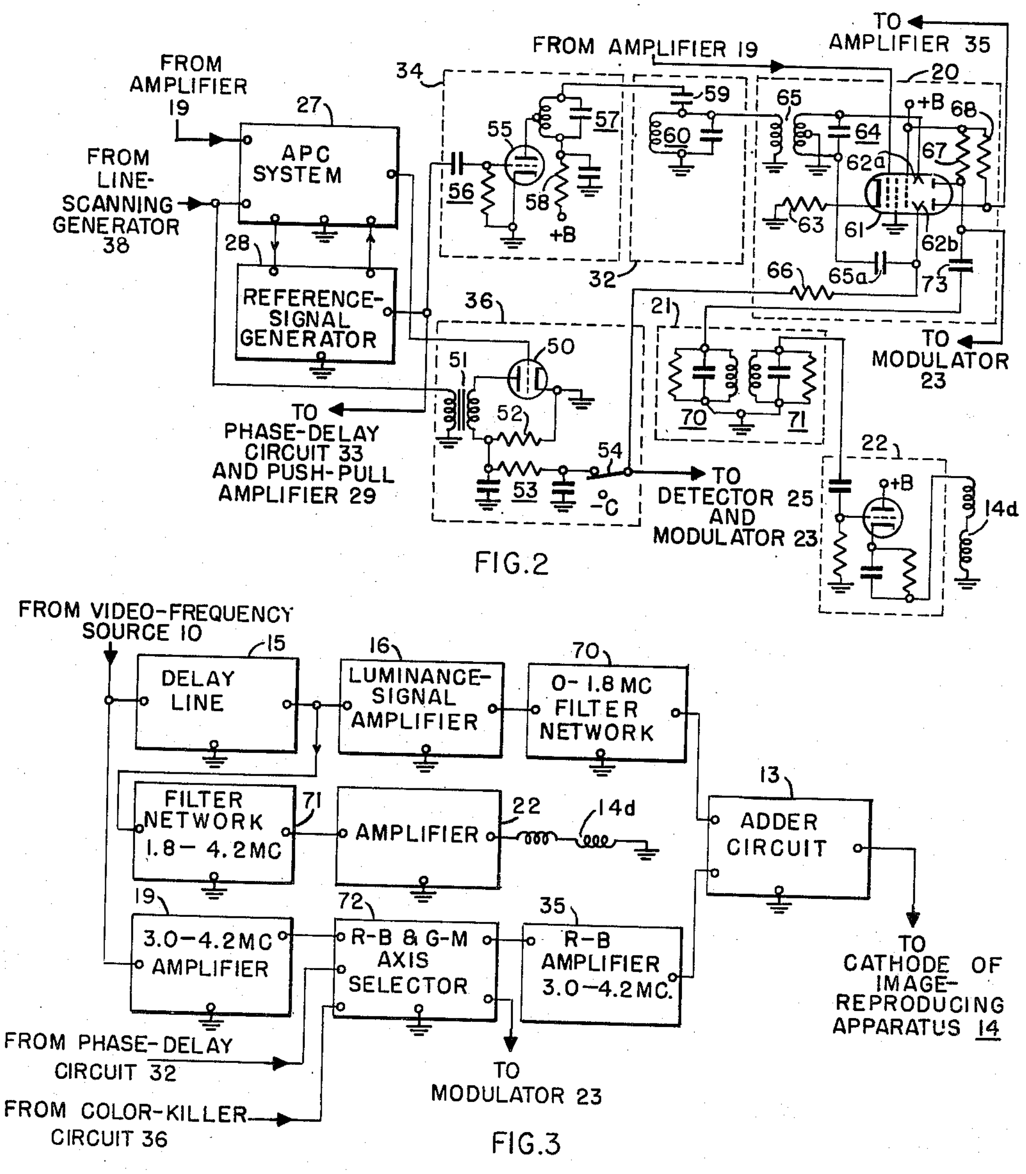

Referring to the drawings:

Fig. 1 is a schematic diagram of a color-television receiver including a compatible image-reproducing system in accordance with the present invention;

Fig. 1*a* is a vector diagram useful in explaining the operation of the image-reproducing system of Fig. 1;

Fig. 1*b* comprises a group of curves useful in explaining the operation of the compatible image-reproducing system of Fig. 1;

Fig. 2 is a more detailed diagram of a portion of the image-reproducing system of Fig. 1, and Fig. 3 is a diagram of a modified portion of the image-reproducing system of Fig. 1.

*General description of receiver of Fig. 1*

Referring now to Fig. 1 of the drawings, there is represented a color-television receiver of the superheterodyne type suitable for utilizing an NTSC type of color-television signal and, more specifically, a receiver of the type described in the aforementioned I. R. E. article entitled "Processing of the NTSC color signal for one-gun sequential color displays." The receiver includes a video-frequency signal source 10. The source 10 can be conventional equipment for supplying an NTSC type of composite video-frequency signal, for example, it may include a radio-frequency amplifier having an input circuit coupled to an antenna 11, an oscillator-modulator, an intermediate-frequency amplifier, and a detection system for deriving the video-frequency signal. An image-reproducing system 12, in accordance with the present invention, is coupled to an output circuit of the unit 10. Though the system 12 will be described fully hereinafter, it will be helpful to describe at this time, at least generally, some of the components in the system 12 and their combination. The system 12 includes a luminance channel coupled to the aforesaid output circuit of the unit 10 and including, in cascade in the order named, a delay line 15, a luminance-signal amplifier 16, a 0–3 megacycle filter network 17, and an adder circuit 13, the output circuit of the latter unit being coupled to the cathode of a single-gun image-reproducing apparatus 14. The delay line 15 is conventional and serves to equalize the time of translation of the luminance signal through the units 15, 16, and 17 with that for translation of the chrominance signal through other channels to be considered hereinafter. The amplifier 16 is a conventional wide band amplifier. The image-reproducing apparatus 14 is a single-gun, focus-mask type of apparatus fully considered in the aforesaid I. R. E. article and will be considered more fully hereinafter.

The image-reproducing system 12 also includes, coupled in cascade in the order named between the aforesaid output circuit of the source 10 and an auxiliary deflection winding **14*d* in the apparatus 14, an amplifier 19 having a pass band of approximately 3.0–4.2 megacycles, an R–B and G–M axis selector 20, a 3.0–4.2 megacycle filter network 21, and a deflection-signal amplifier 22. Details of the axis selector 20, the network 21, and the amplifier 22 will be considered hereinafter with respect to Fig. 2. An output circuit of the selector 20 is also coupled through an R–B amplifier 35, having a pass band of 3.0–4.2 megacycles, and the adder circuit 13 to the cathode of the image-reproducing apparatus 14**.

For effecting control of the signal-detecting and color-switching signals in a manner to be considered more fully hereinafter, the system 12 includes, in cascade in the order named and coupled to an output circuit of the amplifier 19, an automatic-phase-control system 27 and a reference-signal generator 28. The generator 28 can be a conventional sine-wave generator and the system 27 maintains the operation of the generator 28 in synchronism and at a specific phase with respect to a reference signal developed at the transmitter. A more detailed description of the system 27 will be presented hereinafter when considering the system 12 in detail. The output circuit of the generator 28 is coupled through a push-pull amplifier 29 to a color-switching control grid **14*b* in the image-reproducing apparatus 14**.

There are also coupled in cascade in the order named between an output circuit of the axis selector 20 and an input circuit of the adder circuit 13, a modulator 23 and a 6.6–7.8 megacycle filter network 24. The output circuit of the generator 28 is coupled through a second harmonic amplifier 34 and a phase-delay circuit 32, both components of the system 12, to an additional input circuit of the axis selector 20. A control circuit in the axis selector 20 for controlling the state of operation thereof is coupled to an output circuit of a color-killer circuit 36, a component in the system 12 and to be considered more fully hereinafter. The output circuit of the generator 28 is also coupled through a phase-delay circuit 30 and a third harmonic amplifier 31 to an input circuit of the modulator 23. The modulator 23, the filter network 24, and the third harmonic amplifier 31 can be of conventional construction, units of these types being so well known as to require no further description. The phase-delay circuits 30 and 32 are networks for delaying the phase of the signal generated in the generator 28 by appropriate amounts so that the signals applied to the axis selector 20 and the modulator 23, after such phase delays, are in phase with the desired modulation axis of the subscribed wave signal, as will be discussed more fully hereinafter.

There are also coupled in cascade in the order named between an output circuit of the amplifier 19 and an input circuit of the adder circuit 13, an M–Y synchronous detector 25 and a 0–0.6 megacycle filter network 26. An input circuit of the synchronous detector 25 is coupled to the color-killer circuit 36 to control the state of operation of the detector 25, in a manner to be considered more fully hereinafter. An additional input circuit of the synchronous detector 25 is coupled through a phase-delay circuit 33 to the output circuit of the generator 28 for the purpose of applying, from the unit 28 to the detector 25, a locally generated signal which is in phase with the M–Y modulation component of the subcarrier wave signal as more fully described in the aforesaid I. R. E. article.

A synchronizing-signal separator 37 is also coupled to an output circuit of the video-frequency signal source 10 and has output circuits coupled through a line-scanning generator 38 and a field-scanning generator 39 to horizontal and vertical deflection windings 14c, respectively, in the image-reproducing apparatus 14. An output circuit of the generator 38, for example, a tap on the horizontal deflection transformer therein is coupled to input circuits of the APC system 27 and the color-killer circuit 36, both components of the system 12 and to be considered more fully hereinafter, for applying horizontal flyback pulses as gating signals to such units.

An output circuit of the video-frequency signal source 10 is also coupled to a sound-signal reproducing unit 40 which may comprise a conventional intermediate-frequency amplifier, an audio-frequency detector, an audio-frequency amplifier, and a sound reproducer.

Except for the details of combination of circuits in the image-reproducing system 12, all of the circuit components thus far described are conventional and well known, most of such components being fully considered in the aforesaid January 1954 I. R. E. article entitled "Processing of the NTSC color signal for one-gun sequential color displays." Therefore, no detailed description of such circuit components is provided herein.

*General operation of receiver of Fig. 1*

Considering briefly now the operation of the receiver of Fig. 1 as a whole and assuming the components of the image-reproducing system 12 and their combination to be conventional and as described in the aforesaid I. R. E. article, a desired composite color-television signal of the NTSC type is intercepted by the antenna system 11, selected, amplified, converted to an intermediate-frequency signal, further amplified, and the composite video-frequency signal component thereof detected in the unit 10. If color information is being transmitted, the composite video-frequency signal comprises conventional line- and field-synchronizing components, a color burst synchronizing component, and the aforementioned luminance and chrominance signals. The luminance signal is translated through the luminance-signal channel, including the units 15, 16, 17, and 13 in the image-reproducing system 12, and applied to the cathode of the image-reproducing apparatus 14. The chrominance signal is translated through the amplifier 19 and converted by means of the axis selector 20 to a pair of chrominance signals. One of these chrominance signals has only information representative of red and blue, that is, is a subscriber wave signal modulated only by an R–B component. The other chrominance signal has information representative of green, that is, is a subcarrier wave signal modulated only by a G–M component. The converted signal having red and blue information is translated through the amplifier 35, the adder circuit 13, and applied to the cathode of the picture tube in the image-reproducing apparatus 14. In the modulator 23, the converted signal having green information is heterodyned with a signal having the third harmonic frequency of the initially applied subcarrier wave signal for developing a second harmonic chrominance signal including information representative of green. The latter signal is translated through the filter network 24, the adder circuit 13, and applied to the cathode of the image-reproducing apparatus 14. The phasing of the third harmonic signal is such that the developed signal, after translation through the network 24 and the adder circuit 13, will apply the G–M information to the cathode of the picture tube in coincidence with the impinging of the electron beam on the green phosphors.

The chrominance signal in the output circuit of the amplifier 19 is also utilized in the synchronous detector 25 to derive a luminance-correction signal M–Y, the low-frequency components of which are translated through the filter network 26 and the adder circuit 13 for utilization in the image-reproducing apparatus 14 to correct for luminance errors inherently caused by the chrominance signals in a single-gun tube such as utilized in the apparatus 14.

To effect proper operation of the axis selector 20, the modulator 23, and the synchronous detector 25, that is, to control these units to operate in correct relationship with respect to the appropriate phases of the modulated subcarrier wave signal applied thereto, a sine-wave reference signal of the same frequency as the subcarrier wave signal is developed in the generator 28 and controlled in phase with respect to the subcarrier wave signal by means of the APC system 27. The system 27 is responsive to the reference signal and the color burst signal translated through the amplifier 19 and maintains the reference signal at a specific phase with respect to the color burst synchronizing signal and thus maintains the reference signal at specific phases with respect to the different modulation phases of the applied subcarrier wave signal. These phase relationships are represented by the vector diagram of Fig. 1*a*. The R–B modulation axis of the subcarrier wave signal is 29° clockwise, the G–M axis 40° counterclockwise, and the M–Y signal axis 161° clockwise or 199° counterclockwise with respect to the phase of the color burst signal.

The reference signal developed in the generator 28 is doubled to a second harmonic signal in the amplifier 34 and the phase of such second harmonic signal is delay by means of the phase-delay circuit 32 so as to render the axis selector 20 cyclically and sequentially conductive in phase with the R–B and the G–M axes of the modulated subcarrier wave signal to develop a pair of subcarrier wave signals, one of which is modulated solely by R–B information and the other of which is modulated solely by G–M information. The manner in which the developing of these wave signals is effected will be described more fully hereinafter when considering the system 12. The signal developed in the generator 28 is controlled in phase by the phase-delay circuit 30 so as to have a specific phase with respect to the time of impingement of the beam in the picture tube on the green phosphors and such phase-controlled signal is then multiplied to a third harmonic signal in the amplifier 31, the latter signal being employed in the modulator 23 to develop a second harmonic subcarrier wave signal modulated by G–M information at a phase such that, when such developed signal is applied to the picture tube, the G–M information is applied to the green phosphors. The signal developed in the generator 28 is also controlled in phase by the circuit 33 to be in phase with the M–Y axis of the applied subcarrier wave signal, thereby to derive the M–Y component in the detector 25.

The signal developed in the generator 28 is also applied through the push-pull amplifier 29 to the color-switching grid 14*b* in the image-reproducing apparatus 14, the applied or color-switching signal having a specific phase with respect to the fundamental subcarrier wave signal translated through the amplifier 35 and which includes R–B information at a specific phase. The color-switching signal also has a specific phase with respect to the second harmonic subcarrier wave signal developed in the modulator 23 and which includes G–M color information at a specific phase. The phase relations of the color-switching, fundamental, and second harmonic wave signals are as represented by the curves of Fig. 1*b*. The vertical lines G, R, R, G, B, and B represent the times of impingement of the cathode-ray beam on the green (G), red (R), and blue (B) phosphors. Curve F represents the phase of the fundamental subcarrier wave signal modulated by R–B information and it is apparent that the fundamental signal is in phase with the color-switching operation. Curve S represents the second harmonic subcarrier wave signal modulated by G–M information and curve C represents the composite of the fundamental (F) and second harmonic (S) subcarrier wave signals. Line M represents the corrected luminance-signal level, that is, the level for the signal M.

In the synchronizing-signal separator 37, the line- and field-synchronizing signals are separated from the composite video-frequency signal and from each other and are utilized, respectively, in the generators 38 and 39 to develop horizontal deflection and field deflection signals employed in the deflection windings 14c to effect deflection of the cathode-ray beam to scan a raster on the image screen 14a. The scanning of such raster, the intensity-modulation of the cathode-ray beam by means of the corrected luminance, fundamental, and second harmonic subcarrier signals applied thereto, and the differential vertical deflection of the beam by means of the color-switching signal applied to the grid 14b combine to cause the intensity-modulated beam to impinge upon the phosphors for developing the different colors in correspondence with intensity-modulation on such beam for these colors, thereby to reproduce a color image.

In addition to the picture signal, a sound signal is also intercepted and an intermediate-frequency sound signal developed in the source 10. Such intermediate-frequency sound signal is then further amplified in the unit 40 and the audio-frequency components thereof are detected, additionally amplified, and utilized to reproduce sound in the unit 40.

When a monochrome television signal is intercepted by the antenna 11, all of the units in the receiver of Fig. 1 function in the manner just described except for some of the units used for developing color images. Since no color-synchronizing signal is received with a monochrome signal, the APC system 27 is unable to function and the color-switching signal developed by the generator 28, though it has a frequency of approximately 3.6 megacycles, is no longer locked in specific phase relation with line frequency. The failure of the APC system 27 to function causes the color-killer circuit 36, in a manner to be explained more fully hereinafter, to develop a negative bias potential which causes the modulator 23 and the detector 25 to become nonconductive and which changes the mode of operation of the selector 20 in a manner to be considered in detail hereinafter. As a result, only monochrome information is applied to the picture tube to cause the reproduction of a monochrome image. To reproduce such monochrome image the intensity of the beam in the picture tube, during each differential vertical deflection caused by the color-switching signal, is such as to excite the different color phosphors to develop a composite neutral shade having a brightness range between black and white for every elemental area of the image. As previously mentioned, in practice, when the frequency of the intensity-modulation of the electron beam is in the vicinity of 3.6 megacycles, that is, of the frequency of the color-switching signal, an excess of beam energy may be applied to either the red or blue phosphors at the expense of less energy applied to the other thereof. This results in red and blue areas in the reproduced image forming the spurious red and blue patterns. Such excess does not occur in the green phosphors since they are excited by the beam at twice the rate of excitation of the red and blue phosphors.

*Description of image-reproducing system of Figs. 1 and 2*

In describing the image-reproducing system 12 of Fig. 1, reference will be made to Fig. 1 to describe generally the combination of specific units in accordance with the present invention and to Fig. 2 to describe details of at least some of these units.

The compatible image-reproducing system 12 of Fig. 1 comprises a circuit for supplying monochrome or color signals representative, respectively, of televised monochrome or color images. More specifically, such circuit includes the output circuit of the video-frequency signal source 10 coupled to the input circuits of the amplifier 19 and the delay line 15. The signal supplied by such circuit is, when color information is being transmitted, an NTSC type of composite video-frequency signal including a luminance signal having a band width of approximately 0–4.2 megacycles and a modulated subcarrier wave signal, conventionally designated as a chrominance signal, having a mean frequency of approximately 3.6 megacycles and side bands extending over the frequency range of approximately 3.0–4.2 megacycles. Such subcarrier wave signal includes modulation components at specific phases as represented by the vector diagram of Fig. 1*a*. When monochrome information is being transmitted, such supplied signal is a conventional monochrome signal having a band width of approximately 0–4 megacycles.

The image-reproducing system 12 of Fig. 1 also includes image-reproducing apparatus, specifically the apparatus 14, including a plurality of parallel color-reproducing strips, means for developing an electron beam, deflection means for causing the beam to scan a raster on the strips, and color-switching means for cyclically moving the electron beam across the strips to reproduce a monochrome or color image. Specifically, the image-reproducing apparatus 14 is a single-gun focus-mask type of picture tube fully considered in the aforementioned January 1954 I. R. E. article. The apparatus 14 includes a picture tube having an image screen 14a on which color-reproducing strips, specifically, groups of phosphors for emitting green, red, and blue lights are deposited in an interleaved manner in the order, for each group, of green, red, green, and blue. As conventionally employed, these strips extend horizontally. Such tube also includes color-switching means, such as the control grid 14b, coupled to the output circuit of the push-pull amplifier 29. The grid 14b is arranged to have a wire of one group of grid wires positioned behind each red phosphor and a wire of another group of grid wires positioned behind each blue phosphor. The 3.6 megacycle signal developed in the amplifier 29 by means of the generator 28 is applied to the two groups of grid wires to effect a 3.6 megacycle vertical deflection to cause the electron beam, emitted from the cathode of the picture tube and deflected to scan a raster on the phosphor strips by means of the deflection windings 14c, to move vertically across each group of phosphor strips for each elemental area of the reproduced image as each horizontal line is being scanned. Spurious color patterns tend to appear in reproduced monochrome images in such apparatus when signals applied to the cathode thereof have frequencies in the vicinity of the color-switching frequency, that is, frequencies of approximately 3.6 megacycles or, more specifically, in the range of 3.0–4.2 megacycles.

The compatible image-reproducing system also includes a signal-translating channel coupled between the supply circuit and the beam-developing means for translating a band of the supplied signals having frequencies below the color-switching frequency for intensity-modulating the electron beam. More specifically, such channel includes the luminance channel comprising the delay line 15, the amplifier 16, the filter network 17, and the adder circuit 13 coupled in that order between the output circuit of the source 10 and the cathode of the picture tube. The filter network 17 has an upper cutoff frequency of 3 megacycles and thus only signals in the range of 0–3 megacycles are translated through the luminance channel to intensity-modulate the cathode of the picture tube.

Finally, the compatible image-reproducing system of Fig. 1 includes another signal-translating channel including auxiliary deflection means for developing a field in the path of the electron beam. Such other channel comprises the amplifier 19, the R–B and G–M axis selector 20, the filter network 21, the amplifier 22, and the auxiliary deflection winding **14*d*. This channel is coupled to the supply circuit, specifically to the source 10, for translating a band of the supplied monochrome signals having frequencies in the vicinity of the color-switching frequency for effecting deflection modulation of the electron beam lengthwise of the phosphor strips on the image screen 14*a*, thereby to provide high-definition monochrome information when monochrome images are being reproduced and consequently to minimize the spurious red and blue patterns in the reproduced monochrome images. More specifically, the band of supplied monochrome signals has frequencies in the range of 3.0–4.2 megacycles, as determined by the pass band of the amplifier 19, and the auxiliary deflection winding 14*d*** is so positioned physically on the neck of the picture tube that the field developed by such winding is effective to cause minute horizontal deflection of the electron beam in magnitude and sense determined by the intensity and polarity of the high-frequency monochrome signal. More specifically, such differential horizontal deflection is such as to vary the horizontal velocity of the beam in inverse relation to the magnitude of the high-frequency component. Such "velocity modulation" is more fully considered in United States Patent 2,182,326 to Urtel.

The additional signal-translating channel also includes the reference-signal generator 28, the second harmonic amplifier 34, the phase-delay circuit 32, and the color-killer circuit 36. The generator 28 is a sine-wave generator for developing a signal which is substantially equal in frequency to the mean frequency of the modulated subcarrier wave signal translated through the amplifier 19, that is, for developing a signal of approximately 3.6 megacycles. The phase and frequency of the signal developed in the generator 28 are controlled by the automatic-phase-control system 27 which may be of a type described in an article entitled "The DC quadricorrelator: a two-mode synchronization system," published in the January, 1954 issue of the Proceedings of the I. R. E. at pages 288–299, inclusive. The details of such an automatic-phase-control system are particularly considered at page 293 of this article with reference to Fig. 5 thereof. As described in such article, the system 27 includes the conventional quadrature-phase detector for controlling the phase of the signal developed in the generator 28 so that the reference signal has a specific phase relation with respect to the modulated subcarrier wave signal and also includes an in-phase detector. The in-phase detector is utilized to improve the automatic phase control of the system 27 and additionally develops a unidirectional potential which has a maximum magnitude when the signal developed in the generator 28 is in proper phase relation with respect to the modulated subcarrier wave signal. In the circuit described in such article, such potential is negative when the generator 28 is properly synchronized and is utilized by the color-killer circuit 36 to control the state of operation of circuits in the chrominance and luminance channels of the receiver. The color-killer circuit 36 has input circuits coupled to the in-phase detector in the APC system 27 and to a tap on the horizontal transformer in the line-scanning generator 38. The output circuit of the color-killer circuit 36 is coupled to control circuits in the selector 20, in the modulator 23, and in the M–Y synchronous detector 25.

Referring now to Fig. 2 of the drawings, the color-killer circuit 36 is a control circuit coupled to the axis selector 20 for controlling such selector to translate high-frequency components applied thereto cyclically to different output circuits when a color image is being reproduced and to one output circuit when monochrome images are being reproduced. The color-killer circuit 36 comprises a triode 50 having the cathode thereof grounded and the control electrode thereof coupled to the in-phase detector in the APC system 27. The anode of the triode 50 is coupled through the secondary winding of a transformer 51 and a load resistor 52 to the cathode of the triode. Additionally, the junction of the secondary winding of the transformer 51 and the load resistor 52 is coupled through a low-pass filter network 53 and a switch 54 to an input circuit of the axis selector 20. The pass band of the filter 53 is such as to translate substantially only unidirectional signals.

The second harmonic amplifier 34 in Fig. 2 includes a triode 55 having the control electrode thereof coupled through a biasing network 56 to the output circuit of the reference-signal generator 28 and having the cathode thereof grounded. The anode of the tube 55 is coupled to a tapped terminal on a parallel-resonant circuit 57 having one of the terminals thereof connected through a load resistor 58 to a source of +B potential and the other terminal thereof connected through a condenser 59 to a parallel-resonant circuit 60 in the phase-delay circuit 32. The resonant circuit 57 is tuned to approximately 7.2 megacycles, that is, to the second harmonic of the mean frequency of the subcarrier wave signal. The resonant circuit 60 is tuned to approximately 7.2 megacycles and coupled to the tuned circuit 57 with such degree of inductive coupling or other reactive coupling, such as capacitive, as represented by the condenser 59, or resistive, as to obtain the phase delay of the 7.2 megacycle reference signal required for use in the axis selector 20, now to be described in detail. The reference generator 28, second harmonic amplifier 34, and phase-delay circuit 32 comprise means coupled to the selector 20 for controlling such selector cyclically to translate different segments of the high-frequency components supplied by the amplifier 19 through different ones of a pair of output circuits of the selector 20 when color images are being reproduced.

The axis selector 20 is a signal-translating device including a pair of output circuits and, specifically, includes a special type of electron tube 61 commercially known as a beam-switching tube, for example, a type 6AR8 tube. In addition to conventional cathode and control electrodes, the tube 61 includes a pair of deflection electrodes **62*a*, 62*b* and a pair of anodes. The cathode of the tube 61 is coupled through a biasing resistor 63 to ground while an electron-intensity control electrode of the tube 61 is coupled to the output circuit of the amplifier 19. Another grid electrode of the tube 61 is grounded, this electrode being conventionally known as the focusing electrode, and the third grid electrode, known as the accelerating electrode, is coupled directly to a source of potential +B. The deflection electrodes 62*a*, 62*b* are coupled to opposite terminals of a tuned secondary circuit 64 of a transformer 65, the resonant frequency of the tuned circuit being approximately 7.2 megacycles. The primary winding of the transformer 65 is coupled to the output circuit of the phase-delay circuit 32 and the secondary winding of such transformer has a center tap connected to ground. The deflection electrode 62*b* is coupled to the tuned circuit 64 through a condenser 65*a* and is also coupled through an isolating resistor 66 to the output circuit of the color-killer circuit 36. The anodes of the tube 61 are components of a pair of anode output circuits, specifically being individually coupled through different ones of resistors 67 and 68 to the source of +B potential. One output circuit is coupled to the R–B amplifier 35 and the other output circuit is coupled to the modulator 23 and through a condenser 73, the filter network 21, and the amplifier 22 to the auxiliary deflection winding 14*d*. The filter network 21 comprises a pair of coupled damped tuned circuits 70 and 71 each tuned approximately to a mean frequency of 3.6 megacycles and being sufficiently broadly tuned to have a pass band of approximately 3.0–4.2 megacycles. The amplifier 22 is a conventional cathode-follower type of power amplifier for developing signals for application to the deflection winding 14*d***.

*Operation of image-reproducing system of Fig. 1*

The general operation of the image-reproducing system 12 of Fig. 1 has been previously described herein and, therefore, the specific operation of only that portion of the system which is modified in accordance with the present invention will be considered in detail.

The luminance channel including the units 15, 16, 17, and 13, the channel for developing the second harmonic subcarrier wave signal modulated by information representative of green and including the units 30, 31, 23, and 24, and the channel for developing the M–Y correction signal including the units 33, 25, and 26 operate in a conventional manner such as described in the January 1954 I. R. E. article previously referred to herein and entitled "Processing of the NTSC color signal for one-gun sequential color displays." The operation of the axis selector 20 and the units 21, 22, and 14*d* coupled to the output circuit thereof as well as of the color-killer circuit 36 will be considered in some detail.

Before considering the operation of the last-mentioned units, as more fully represented in Fig. 2, it will be helpful to consider in some detail the problem which applicant's novel image-reproducing system is designed to solve. As previously mentioned, when an image-reproducing apparatus of the focus-mask type, such as represented by the apparatus 14 of Fig. 1, is reproducing a monochrome image, spurious red and blue patterns tend to appear in such image. These patterns result from the combined effect of a high-frequency intensity-modulation of the electron beam in the picture tube, a frequency in the vicinity of 3.6 megacycles, and of a 3.6 megacycle color-switching signal. If the intensity modulation and the color switching happen to be in-phase, the positive peak of the beam intensity will occur as one phosphor is being excited, for example, as the red phosphor is excited and the negative peak will occur as the blue phosphor is excited, since these phosphors are excited at a 3.6 megacycle rate. This will result in an excess of red over blue where no such excess should exist. As the phase relations of the color-switching operation and the intensity modulation of the beam vary from such in-phase relation caused, for example, by a small difference in the frequency of the two, there will tend to be periods when the blue is in excess and other periods when the red is in excess. As a result, spurious red and blue patterns appear in the monochrome image. If the operation of the picture tube was linear, then none of these effects would appear for green because the beam impinges on the green phosphors at a rate twice that of impingement on the red and blue phosphors. However, the operation is not linear and rectification of the signal occurring in coincidence with the impingement of the beam on the green phosphors does occur resulting in spurious green patterns. These patterns are not as evident or present to the same degree when a color image is being reproduced because the interlaced relationship of the color information with line frequency causes any such patterns to have low visibility. Since there is no such interlacing when a monochrome image is being reproduced, due to the lack of synchronization of the color-switching operation with line frequency, these patterns tend to be highly visible, to destroy all high-definition information in the monochrome image, and otherwise deleteriously affect the reproduced monochrome image.

The beating of the high-frequency components and the color-switching operation causes the proportions of red, green, and blue lights emitted from an elemental area to become unbalanced toward red or blue. If the high-frequency information is applied as differential horizontal deflection of the electron beam to sharpen edges in the reproduced monochrome image, then, though the position of the beam on the red, green, and blue phosphors is changed on each phosphor in accordance with the magnitude and sense of the high-frequency information, the relative intensities of the red, green, and blue lights for each elemental area are not disturbed. Consequently, no excess of one or another color occurs and the spurious color patterns are minimized. The deflection modulation also eliminates the spurious green patterns because high-frequency information in coincidence with the impingement on the green phosphors is no longer introduced by means of the nonlinear intensity effect of the beam. Therefore, in accordance with the present invention, all monochrome high-frequency information is applied to the picture tube as horizontal deflection modulation of the beam. The selector 20 is conditioned to operate to apply high-frequency information as intensity modulation when a color image is being reproduced and conditioned to operate to apply the high-frequency information as deflection modulation when a monochrome image is being reproduced.

Referring to Fig. 2 of the drawings, the reference signal developed in the output circuit of the generator 28 is applied to the harmonic amplifier 34 wherein it is doubled to become a second harmonic or 7.2 megacycle signal. The second harmonic signal is controlled in phase by the phase-delay circuit 32 and coupled through the transformer 65 for application with opposite phases to the pair of deflection electrodes 62*a* and 62*b*. The 3.0–4.2 megacycle signal translated through the amplifier 19, regardless of whether it is a monochrome or color signal, is applied to the control electrode of the tube 61. In operation, the deflection electrodes 62*a* and 62*b* in the tube 61, if a color image is being reproduced, cause deflection of the electron beam emitted from the cathode therein to cause such beam to impinge on the anodes therein at a 7.2 megacycle rate. If the deflection operation is properly phased by controlling the phasing of the 7.2 megacycle reference signal with respect to the modulated subcarrier wave signal applied to the control electrode in the tube 61, then the electron beam is directed on the upper anode of the tube 61 in coincidence with the application of that phase of the modulated subcarrier wave signal which includes information representative of green, that is, in coincidence with the application of the G–M axis of the wave signal to the control electrode of the tube. Similarly, the electron beam is caused to impinge on the lower anode in coincidence with the application of that phase of the subcarrier wave signal including red and blue information, that is, in coincidence with the application of the R–B axis of the wave signal to the control electrode. In this manner, the output signal developed in the circuit including the upper anode includes a subcarrier wave signal at fundamental frequency modulated substantially only along the G–M axis and the output signal in the circuit including the lower anode includes a fundamental subcarrier wave signal modulated substantially only along the R–B axis. Since the G–M and R–B axes are separated by approximately 70° and the operation of the selector 20 is based on a quadrature relationship for these axes, the output signals are not pure R–B and G–M signals but are sufficiently pure for utilization. If desired, a correction network for cross coupling the outputs may be employed to improve the degree of purity. The R–B and G–M wave signals are utilized in the manner previously decsribed herein to reproduce a color image.

When a color signal is being received, the in-phase detector in the system 27 develops a negative potential which is applied to the grid of the triode 50 in the color-killer circuit 36 to render such triode nonconductive. Therefore, during such period of time no potential is developed in the output circuit of the unit 36 and no bias potential is applied from the unit 36 to the deflection electrode 62*b* in the axis selector 20. Consequently, the tube 61 in the unit 20 can function in its normal manner. However, when a monochrome signal is being received, the system 27 does not develop a negative bias potential and the tube 50 is rendered conductive periodically when positive-going flyback pulses are applied to the anode thereof through the transformer 51. This results in a net negative potential being developed across the load resistor 52. This negative potential is applied through the resistor 66 to the deflection electrode 62b resulting in a continuous deflection of the beam in the tube 61 away from the electrode 62b toward the electrode 62a. Alternatively, the same effect can be accomplished when color signals are being received by connecting the blade of the switch 54 to the negative bias potential source —C, if the viewer wishes to view a monochrome image instead of a color image. When such negative potential is applied to the deflection electrode 62b, the electron beam impinges solely on the upper anode since the intensity of the 7.2 megacycle signal applied to the deflection electrodes 62a and 62b is insufficient to overcome the high negative bias on the deflection electrode 62b. Consequently, the 3.0–4.2 megacycle components applied to the control electrode of the tube 61 are translated only to the output circuit including the upper anode and translated through the filter network 21 and the deflection amplifier 22 for application to the auxiliary deflection winding 14d. This results in the high-frequency monochrome information being applied to the electron beam as differential horizontal deflection, thereby effecting reproduction of such high-frequency information in the reproduced image without causing the reproduction of spurious color patterns.

If the brightness in the image is changing from one level to a higher level, the differential horizontal deflection has the effect of accelerating the horizontal sweep of the beam as the intensity of the beam starts to change from the one level and decelerating the horizontal sweep as the intensity of the higher level is approached. Of course, the acceleration and deceleration occur in coincidence with changes in beam intensity only if such changes represent high-definition information such as the edge of a vertical bar or any object having sharp, distinct, vertical edges. Otherwise, there would be no high-frequency information received and, consequently, the auxiliary deflection winding would not develop an accelerating or retarding field.

*Description and operation of portion of image-reproducing system of Fig. 3*

The image-reproducing system described with reference to Figs. 1 and 2 utilizes some of the circuits of the chrominance channel in a dual capacity. These circuits function in one manner when a color image is being reproduced and function in a different manner, to effect deflection modulation of the electron beam in the picture tube in response to high-frequency monochrome components, when a monochrome image is being reproduced. In accordance with the present invention, it is not essential that circuits in the chrominance channel be so used and, in fact, under some conditions it may not be desirable to employ such circuits. Alternatively, the high-frequency components of the composite video-frequency signal may be translated through an auxiliary luminance channel, as represented in Fig. 3, for application of such high-frequency components to the auxiliary deflection winding. Since many of the units of Fig. 3 are identical with units in Figs. 1 and 2, such are identified by means of the same reference numerals.

In Fig. 3, the luminance channel including the units 15, 16, 70, and 13 is modified to translate directly, for intensity modulation of the electron beam developed in the picture tube, only those video-frequency components in the range of, for example, 0–1.8 megacycles by proportioning the pass band of a filter network 70 to effect such result. An auxiliary luminance channel coupled to the output circuit of the delay line 15 has, in cascade in the order named, a filter network 71, the amplifier 22, and the auxiliary deflection winding 14d. The filter network 71 is proportioned to have a pass band of, for example, 1.8–4.2 megacycles for translating the high-frequency video-frequency components through such auxiliary channel. The R–B and G–M axis selector in the chrominance channel is modified in that, as represented in Fig. 3, it has output circuits coupled only to the R–B amplifier 35 and to the modulator 23 and is further modified in having the color-killer circuit 36 coupled to an intensity control electrode therein rather than to one of the deflection electrodes as in Figs. 1 and 2.

Considering now the operation of the portion of the image-reproducing system represented by Fig. 3, when a monochrome image is being reproduced, that portion of the composite video-frequency signal supplied from the source 10, having components in the frequency range of 0–1.8 megacycles, is translated through the units 15, 16, 70, and 13 and applied to the cathode of the picture tube in the image-reproducing apparatus 14. That portion of the same composite video-frequency signal having components in the frequency range of 1.8–4.2 megacycles is translated through the delay line 15, the filter network 71, amplified in the unit 22, and utilized to effect differential horizontal deflection modulation by means of the auxiliary deflection winding 14d. When a monochrome image is being reproduced, the chrominance channel is effectively rendered inoperative by means of the color-killer circuit 36 and, specifically, the axis selector 72 is made nonconductive during this period.

Although the operation just explained results in some duplication of the high-frequency components applied to the picture tube when a color image is being reproduced, for example, the duplication caused by the translation of components in the frequency range of 3.0–4.2 megacycles through both the network 71 and the amplifier 22 to effect horizontal deflection modulation and through the amplifier 35 to effect some intensity modulation of the beam in the picture tube, such diplication is usually beneficial since there tends to be a lack of sharpness in reproduced color images and such excess of high-frequency information tends to make such images more crisp and sharp.

The visibility of red and blue spurious patterns in a monochrome image reproduced by an image-reproducing system, including the circuits of Fig. 3, is so diminished as to be substantially nonexistent. This substantial reduction is caused by utilizing no frequency components having frequencies higher than one-half of the frequency of the color-switching signal, that is, having frequencies higher than 1.8 megacycles for intensity modulation of the electron beam in the picture tube. All components having frequencies higher than 1.8 megacycles are utilized to effect differential horizontal deflection modulation. Consequently, any tendency of the 3.6 megacycle color-switching signal to heterodyne with the intensity-modulation signals of the electron beam does not result in developing low-frequency beat signals in the frequency range of 0–1.8 megacycles and, therefore, any such beat signals are practically invisible.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied monochrome signals having frequencies below said color-switching frequency for intensity-modulating said beam when monochrome images are being reproduced; and another signal-translating channel including auxiliary deflection means for developing a field in the path of said beam and coupled to said supply circuit for translating a band of said supplied monochrome signals having frequencies in the vicinity of said color-switching frequency for effecting deflection modulation of said beam lengthwise of said strips to provide the high-definition monochrome information when monochrome images are being reproduced, thereby to minimize said patterns in reproduced monochrome images.

2. A compatible image-reproducing system comprising: a circuit for supplying monochrome or color signals representative, respectively, of televised monochrome or color images; image-reproducing apparatus including a plurality of parallel groups of color-reproducing strips, means for developing an electron beam, deflection means for causing said beam to scan horizontally and vertically to develop a raster on said strips, and color-switching means for cyclically moving said beam vertically across a group of said strips as said beam scans horizontally to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied monochrome signals having frequencies below said color-switching frequency for intensity-modulating said beam when monochrome images are being reproduced; and another signal-translating channel including auxiliary deflection means for developing a field in the path of said beam and coupled to said supply circuit for translating a band of said supplied monochrome signals having frequencies in the vicinity of said color-switching frequency for effecting differential horizontal deflection modulation of said beam as said beam scans horizontally to provide the high-definition monochrome information when monochrome images are being reproduced, thereby to minimize said patterns in reproduced monochrome images.

3. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips at approximately a 3.6 megacycle rate to reproduce a monochrome or color image, spurious color patterns tending to appear in reproduced monochrome images from signals applied to said apparatus having frequencies in the vicinity of the color-switching frequency; a luminance channel coupled between said supply circuit and said beam developing means for translating components of said supplied monochrome signals having frequencies at least in the range of 0–1.8 megacycles for intensity-modulating said beam when monochrome images are being reproduced; and another signal-translating channel including auxiliary deflection means for developing a field in the path of said beam and coupled to said supply circuit for translating a band of said supplied monochrome signals having frequencies in the vicinity of said color-switching frequency for effecting deflection modulation of said beam lengthwise of said strips to provide the high-definition monochrome information when monochrome images are being reproduced, thereby to minimize said patterns in reproduced monochrome images.

4. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips at approximately a 3.6 megacycle rate to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating components of said supplied monochrome signals having frequencies approximately in the range of 0–3 megacycles for intensity-modulating said beam when monochrome images are being reproduced; and another signal-translating channel including auxiliary deflection means for developing a field in the path of said beam and coupled to said supply circuit for translating a band of said supplied monochrome signals having frequencies in the vicinity of said color-switching frequency for effecting deflection modulation of said beam lengthwise of said strips to provide the high-definition monochrome information when monochrome images are being reproduced, thereby to minimize said patterns in reproduced monochrome images.

5. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied monochrome signals having frequencies below said color-switching frequency for intensity-modulating said beam when monochrome images are being reproduced; and another signal-translating channel including auxiliary deflection means for developing a field in the path of said beam and coupled to said supply circuit and including a pass band of at least 3.0–4.2 megacycles for translating a band of said supplied monochrome signals having frequencies at least in the range of 3.0–4.2 megacycles for effecting deflection modulation of said beam lengthwise of said strips to provide the high-definition monochrome information when monochrome images are being reproduced, thereby to minimize said patterns in reproduced monochrome images.

6. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied monochrome signals having frequencies below said color-switching frequency for intensity-modulating said beam when monochrome images are being reproduced; and another signal-translating channel including auxiliary deflection means for developing a field in the path of said beam and including a band-pass amplifier coupled to said supply circuit for translating components of said supplied monochrome signals having frequencies approximately in the range of 3.0–4.2 megacycles for effecting deflection modulation of said beam lengthwise of said strips to provide the high-definition monochrome information when monochrome images are being reproduced, thereby to minimize said patterns in reproduced monochrome images.

7. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips at approximately a 3.6 megacycle rate to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating components of said supplied monochrome signals having frequencies approximately in the range of 0–3 megacycles for intensity-modulating said beam when monochrome images are being reproduced; and another signal-translating channel including auxiliary deflection means for developing a field in the path of said beam and including a band-pass amplifier coupled to said supply circuit for translating components of said supplied monochrome signals having frequencies approximately in the range of 3.0–4.2 megacycles for effecting deflection modulation of said beam lengthwise of said strips to provide the high-definition monochrome information when monochrome images are being reproduced, thereby to minimize said patterns in reproduced monochrome images.

8. A compatible image-reproducing system comprising: a circuit for supplying monochrome or color signals representative, respectively, of televised monochrome or color images; image-reproducing apparatus including a plurality of parallel groups of color-reproducing strips, means for developing an electron beam, deflection means for causing said beam to scan horizontally and vertically to develop a raster on said strips, and color-switching means for cyclically moving said beam vertically across a group of said strips at approximately a 3.6 megacycle rate as said beam scans horizontally to reproduce a monochrome or color image, spurious color patterns tending to appear in reproduced monochrome images from signals applied to said apparatus having frequencies in the vicinity of the color-switching frequency; a luminance channel coupled between said supply circuit and said beam-developing means for translating components of said supplied monochrome signals having frequencies at least in the range of 0–1.8 megacycles for intensity-modulating said beam when monochrome images are being reproduced; and another channel, including auxiliary deflection means for developing a field in the path of said beam, coupled to said supply circuit and including a pass band of at least 3.0–4.2 megacycles for translating a band of said supplied monochrome signals having frequencies at least in the range of 3.0–4.2 megacycles for effecting differential horizontal deflection modulation of said beam as said beam scans horizontally to provide the high-definition monochrome information when monochrome images are being reproduced, thereby to minimize said patterns in reproduced monochrome images.

9. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a luminance channel coupled between said supply circuit and said beam-developing means including a filter network having a pass band of approximately 0–1.8 megacycles for translating a band of said supplied monochrome signals having frequencies in the range of 0–1.8 megacycles for intensity-modulating said beam when monochrome images are being reproduced; and an auxiliary luminance channel, including auxiliary deflection means for developing a field in the path of said beam, coupled to said supply circuit and including a filter network having a pass band of approximately 1.8–4.2 megacycles for translating a band of said supplied monochrome signals having frequencies in the range of 1.8–4.2 megacycles for effecting deflection modulation of said beam lengthwise of said strips to provide the high-definition monochrome information when monochrome images are being reproduced, thereby to minimize said patterns in reproduced monochrome images.

10. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band proportioned to translate components having frequencies in the vicinity of said color-switching frequency for translating high-frequency components of said supplied signals; a signal-translating device including a pair of output circuits and coupled to said amplifier; means coupled to said device for controlling said device cyclically to translate through different ones of said output circuits different segments of said high-frequency components translated through said band-pass amplifier when color images are being reproduced; a control circuit coupled to said device for controlling said device to translate said high-frequency components to one of said output circuits when monochrome images are being reproduced; and auxiliary deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

11. A compatible image-reproducing system comprising: a circuit for supplying monochrome or color signals representative, respectively, of televised monochrome or color images; image-reproducing apparatus including a plurality of parallel groups of color-reproducing strips, means for developing an electron beam, deflection means for causing said beam to scan horizontally and vertically to develop a raster on said strips, and color-switching means for cyclically moving said beam vertically across a group of said strips as said beam scans horizontally to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band proportioned to translate components having frequencies in the vicinity of said color-switching frequency for translating high-frequency components of said supplied signals; a signal-translating device including a pair of output circuits and coupled to said amplifier; means coupled to said device for controlling said device cyclically to translate through different ones of said output circuits different segments of said high-frequency components translated through said band-pass amplifier when color images are being reproduced; a control circuit coupled to said device for controlling said device to translate said high-frequency components to one of said output circuits when monochrome images are being reproduced; and auxiliary deflection means coupled to said one output circuit and responsive to said translated high-frequency components for effecting differential horizontal deflection modulation of said beam as said beam scans horizontally to provide high-definition monochrome information when monochrome images are being reproduced, thereby to minimize said patterns in reproduced monochrome images.

12. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band proportioned to translate components having frequencies in the vicinity of said color-switching frequency for translating high-frequency components of said supplied signals; an electron-beam switching device including a pair of output circuits and coupled to said amplifier; means coupled to said device for controlling the beam switching of said device cyclically to translate through different ones of said output circuits different segments of said high-frequency components translated through said band-pass amplifier when color images are being reproduced; a control circuit coupled to said device for controlling the beam switching of said device to translate said high-frequency components to one of said output circuits when monochrome images are being reproduced; and auxiliary deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

13. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips at approximately a 3.6 megacycle rate to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band of approximately 3.0–4.2 megacycles for translating high-frequency components of said supplied signals; a signal-translating device including a pair of output circuits and coupled to said amplifier; means coupled to said device for controlling said device cyclically to translate through different ones of said output circuits different segments of said high-frequency components translated through said band-pass amplifier when color images are being reproduced; a control circuit coupled to said device for controlling said device to translate said high-frequency components to one of said output circuits when monochrome images are being reproduced; and auxiliary deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

14. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a luminance channel coupled between said supply circuit and said beam-developing means for translating a band of said supplied signals having frequencies below said color-switching frequency for intensity-modulating said beam; a chrominance amplifier having a pass band of approximately 3.0–4.2 megacycles for translating high-frequency components of said supplied signals; a signal-translating device including a pair of output circuits and coupled to said amplifier; means coupled to said device for controlling said device cyclically to translate through different ones of said output circuits different segments of said high-frequency components translated through said chrominance amplifier when color images are being reproduced; a control circuit coupled to said device for controlling said device to translate said high-frequency components to one of of said output circuits when monochrome images are being reproduced; and auxiliary deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

15. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band of approximately 3.0–4.2 megacycles for translating high-frequency components of said supplied signals; an electron-beam switching device including a pair of anode output circuits, means for developing an electron beam and a pair of deflection electrodes and coupled to said amplifier; means coupled to said deflection electrodes for controlling said beam cyclically to translate through different ones of said anode output circuits different segments of said high-frequency components translated through said band-pass amplifier when color images are being reproduced; a control circuit coupled to one of said deflection electrodes for controlling said beam to translate said high-frequency components to one of said output circuits when monochrome images are being reproduced; and axially deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

16. A compatible image-reproducing system comprising: a circuit for supplying monochrome or color signals representative, respectively, of televised monochrome or color images; image-reproducing apparatus including a plurality of parallel color-reproducing strips, means for developing an electron beam, deflection means for causing said beam to scan a raster on said strips, and color-switching means for cyclically moving said beam across said strips to reproduce a monochrome or color image, spurious color patterns tending to appear in reproduced monochrome images from signals applied to said apparatus having frequencies in the vicinity of the color-switching frequency; a signal-translating channel coupled between said supply circuit and said beam-developing means for translating a band of said supplied signals having frequencies below said color-switching frequency for intensity-modulating said beam; a band-pass amplifier having a pass band of approximately 3.0–4.2 megacycles for translating high-frequency components of said supplied signals; a signal-translating device including a pair of output circuits and coupled to said amplifier; means coupled to said device for controlling said device cyclically to translate through different ones of said output circuits different segments of said high-frequency components translated through said band-pass amplifier when color images are being reproduced; a color-killer circuit coupled to said device for controlling said device to translate said high-frequency components to one of said output circuits when monochrome images are being reproduced; and auxiliary deflection means coupled to said one output circuit and responsive to said translated high-frequency components for effecting deflection modulation of said beam lengthwise of said strips to provide high-definition monochrome information when monochrome images are being reproduced, thereby to minimize said patterns in reproduced monochrome images.

17. A compatible image-reproducing system comprising: a circuit for supplying monochrome or color signals representative, respectively, of televised monochrome or color images; image-reproducing apparatus including a plurality of parallel groups of color-reproducing strips, means for developing an electron beam, deflection means for causing said beam to scan horizontally and vertically to develop a raster on said strips, and color-switching means for cyclically moving said beam vertically across a group of said strips at approximately a 3.6 megacycle rate as said beam scans horizontally to reproduce a monochrome or color image, spurious color patterns tending to appear in reproduced monochrome images from signals applied to said apparatus having frequencies in the vicinity of the color-switching frequency; a luminance channel coupled between said supply circuit and said beam-developing means and having a pass band of approximately 0–3 megacycles for translating components of said supplied signals having frequencies in the range of 0–3 megacycles for intensity-modulating said beam; a chrominance amplifier having a pass band of approximately 3.0–4.2 megacycles for translating high-frequency components of said supplied signals; an electron-beam switching device including a pair of anode output circuits, means for developing an electron beam and a pair of deflection electrodes for cyclically switching said beam between said output circuits and coupled to said amplifier; means coupled to said deflection electrodes for effecting said beam switching to translate through different ones of said output circuits different segments of said high-frequency components translated through said chrominance amplifier when color images are being reproduced; a color-killer circuit coupled to one of said deflection electrodes for rendering said beam switching inoperative to translate said high-frequency components to one of said output circuits when monochrome images are being reproduced; and auxiliary deflection means coupled to said one output circuit and responsive to said translated high-frequency components for effecting differential horizontal deflection modulation of said beam as said beam scans horizontally to provide high-definition monochrome information when monochrome images are being reproduced, thereby to minimize said patterns in reproduced monochrome images.

No references cited.